United States Patent

[11] 3,620,609

| [72] | Inventor | Robert S. John, Jr.<br>Deerfield, Ill. |
|---|---|---|
| [21] | Appl. No. | 735,731 |
| [22] | Filed | June 10, 1968 |
| [45] | Patented | Nov. 16, 1971 |
| [73] | Assignee | Bell & Howell Company<br>Chicago, Ill. |

[54] AUTOMATIC PROJECTOR-RECORDER SYNCHRONIZER
15 Claims, 9 Drawing Figs.

[52] U.S. Cl.......................................... 352/17,
352/22, 352/25, 352/31, 353/15
[51] Int. Cl. ...............................................G03b 31/04,
G03b 31/06
[50] Field of Search.......................................... 352/12, 15,
16, 17, 22, 24, 25, 31; 253/15

[56] References Cited
UNITED STATES PATENTS

| 3,181,421 | 5/1965 | Nimke et al. .................. | 353/15 |
| 2,725,785 | 12/1955 | Templin ...................... | 352/24 |
| 2,854,526 | 9/1958 | Morgan ....................... | 352/17 |
| 3,266,862 | 8/1966 | Wagoner ...................... | 352/12 |
| 3,447,864 | 6/1969 | Shadley ....................... | 352/17 |
| 3,441,342 | 4/1969 | Ball et al. ..................... | 352/17 |
| 3,457,005 | 7/1969 | Goodman ..................... | 352/17 |
| 3,492,068 | 1/1970 | Baron ......................... | 352/12 |
| 3,498,703 | 3/1970 | Gerry .......................... | 352/31 |

Primary Examiner—Samuel S. Matthews
Assistant Examiner—M. L. Gellner
Attorneys—William F. Pinsak and Raymond A. Andrew ABSTRACT: An apparatus which provides sound synchronized accompaniment for motion-picture projection. Upon the expiration of a predetermined time interval after the camera is actuated, a tape cassette recorder starts. Starting of the tape recorder causes a lamp to be energized thereby exposing a portion of the film to create a recorder start indication. Upon stopping of the camera, a stop burst is generated which is recorded upon the control track of the recorder the operation of which also terminates. Synchronization pulses generated by the camera are also recorded upon the control track. During projection, the exposed start indication areas upon the film are utilized to start the recorder the sync pulses maintain synchronization and the burst serves to stop the recorder.

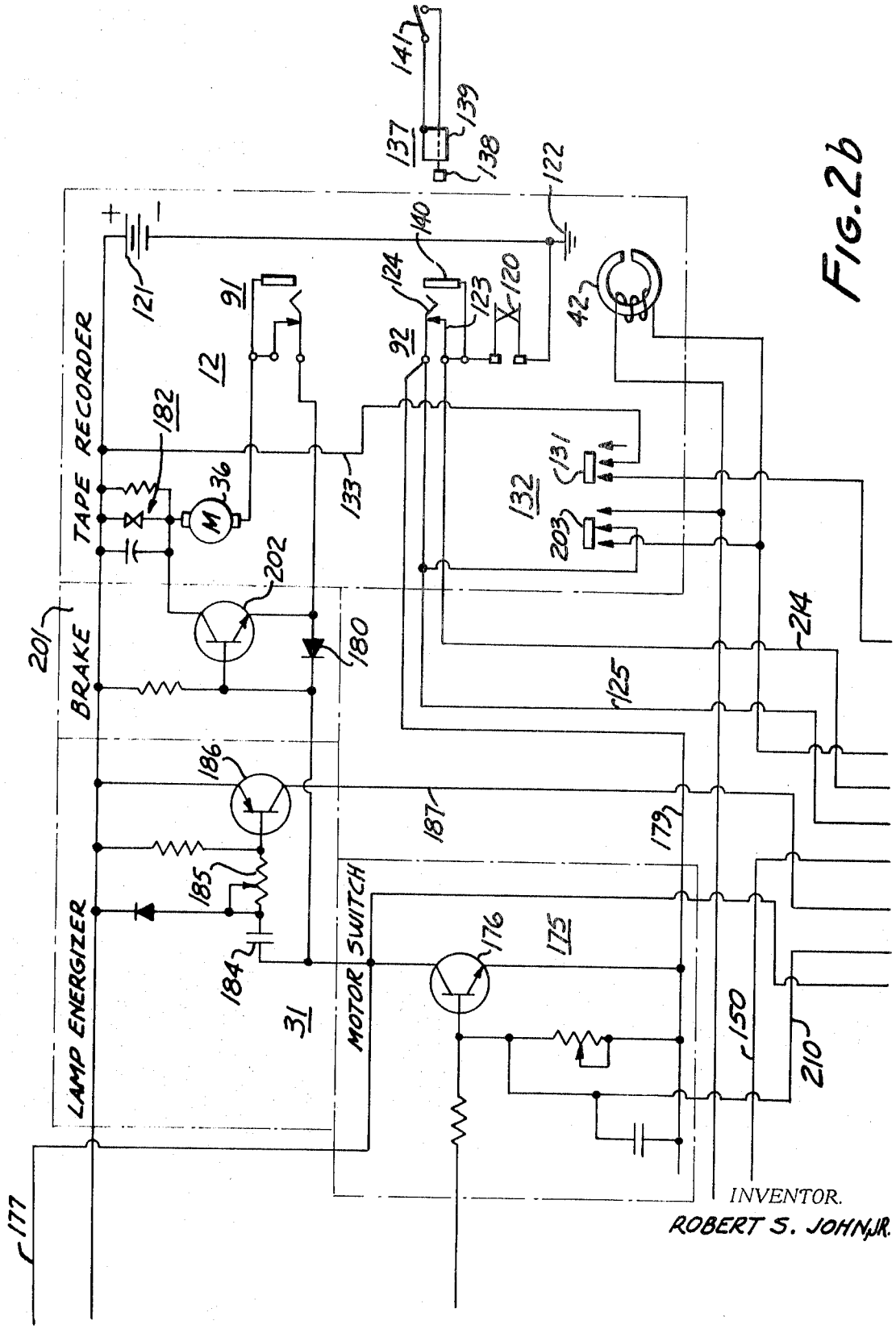

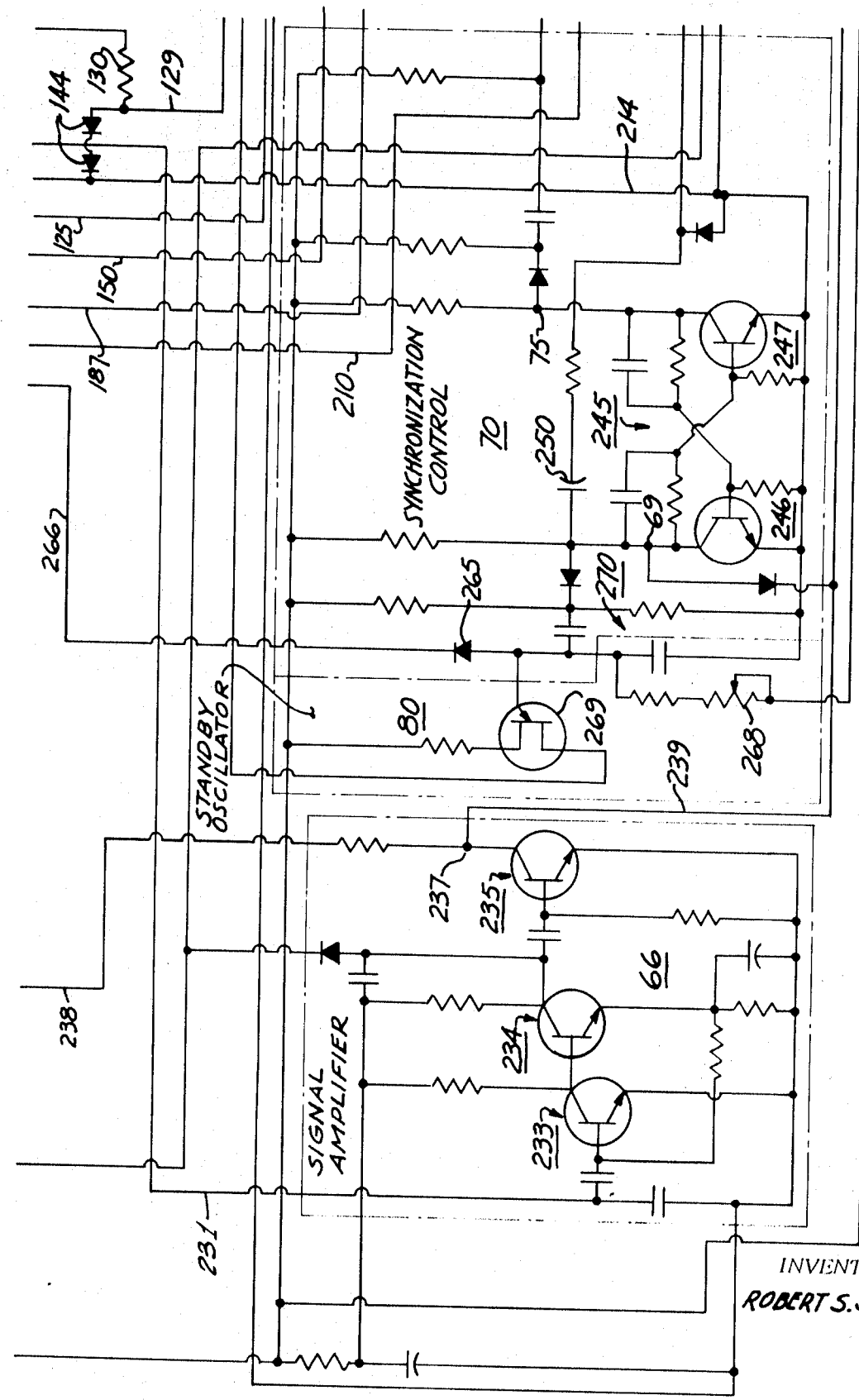
Fig. 2.c
INVENTOR.
ROBERT S. JOHN, JR.

INVENTOR.
ROBERT S. JOHN, JR.
BY

INVENTOR.
ROBERT S. JOHN, JR.

AUTOMATIC PROJECTOR-RECORDER SYNCHRONIZER

CROSS-REFERENCES TO RELATED APPLICATIONS

Aspects of the subject application are related to the following copending patent applications, all of which are assigned to the subject assignee:

U.S. Pat. No. 3,539,248, entitled "Audio-Visual Recording and Display Methods and Apparatus," filed Nov. 20, 1967, by Joseph H. Lancor, Jr.;

U.S. Pat. No. 3,515,470, entitled "Control Information Recording and Sensing Methods and Apparatus," filed Nov. 20, 1967, by Lewis B. Browder;

Application Ser. No. 734,657, entitled "Projector Speed Control Apparatus," filed June 5, 1968, by Eric K. Maxon.

BACKGROUND OF THE INVENTION

1. Field of the Invention

The subject invention relates to sound recording and playback apparatus and, more particularly, to controls for such equipment.

2. Description of the Prior Art

To facilitate an understanding of the subject invention, the prior art will be described in connection with the provision of sound accompaniments for motion pictures, although the scope and utility of the invention is not so limited, as will become apparent as this description proceeds.

As has been shown in the above-mentioned Lancor application, the specification of which is incorporated herein by reference, there exists a need for systems in which sound accompaniments are reproduced synchronously with motion-picture features from an information carrier, such as a magnetic recording tape, which is separate from the film on which the motion-picture sequences are photographed. Despite the fact that this need existed since the early days of cinematography, a decisive solution in this area emerged only recently, as apparent from the above-mentioned Lancor and Browder applications.

SUMMARY OF THE INVENTION

The subject invention resides in various improvements in systems for providing motion pictures with sound accompaniment and also in related areas, such as those concerned with sound-accompanied still pictures or sound recorder, still projector or motion-picture camera controls.

In the following paragraphs several aspects of the invention are defined. To promote an understanding of such definitions, reference numerals taken from the accompanying drawings are provided in parentheses throughout the definitions to suggest parts and circuit which, if desired, may be employed as or in the various means called for.

From a first aspect thereof, the subject invention resides in apparatus for controlling a sound recorder comprising first means 26 for providing a control signal, second means 42 connected to said first means for recording said control signal, and third means 30 connected to said first means for terminating a sound-recording operation in response to said control signal.

From a second aspect thereof, the subject invention resides in apparatus for controlling a sound recorder comprising first means 26 for providing a control signal signifying termination of a sound sequence being recorded by said sound recorder, second means 42 connected to said first means for recording said control signal, third means 30 connected to said first means for terminating a recording of said sound sequence in response to said control signal, and fourth means 156 connected to said first means for inhibiting a provision of said control signal for the duration of said sound sequence.

From a third aspect thereof, the invention resides in audiovisual apparatus comprising selectively actuable first means 11, 303 for retaining pictorial information, second means 22, 287 responsive to actuation of said first means to provide a first control signal during said actuation, selectively actuable third means 12 for recording sound accompaniments for said pictorial information, selectively actuable fourth means 26 for providing a second control signal, fifth means 42, 30 connected to said third and fourth means for recording said second control signal and for terminating a recording operation by said third means in response to said second control signal, and sixth means 156 connected to said second and fourth means for inhibiting provision of said second control signal in response to said first control signal, and for permitting provision of said second control signal upon cessation of said first control signal.

From a fourth aspect thereof, the invention resides in apparatus for controlling a sound recorder, comprising first means 22 for providing a start signal for said sound recorder, selectively actuable second means 30, 56, 57 for stopping said sound recorder, third means 25, 29, 30 connected to said first means for starting said sound recorder in response to said start signal, said third means including bistable means 171 for comparing said start signal to a reference signal and power switch means 175 connected to said bistable comparing means, and fourth means including a feedback circuit 177 extending between said power switch means and said bistable means for causing said sound recorder to continue operation after a starting thereof until a stopping of said sound recorder by said second means.

From a fifth aspect thereof, the invention resides in apparatus for controlling a sound recorder in response to first and second control signals, comprising first means 171 having input means and being constructed to be switched from a first state to a second state in response to said first control signals and from said second state to said first state in response to said second control signals, second means 175 having input means connected to said first means and having output means for energizing said sound recorder in response to a switching of said first means from said first state to said second state, and third means including feedback means 177 between said output means of said second means and said input means of said first means for maintaining said first means in said second state until an occurrence of said second control signal.

From a sixth aspect thereof, the invention resides in apparatus for synchronizing a display of pictorial information with a playback of sound accompaniment, comprising first means 70 for controlling the display of pictorial information with the assistance of synchronization signals played back substantially simultaneously with said sound accompaniment, and second means 80 connected to said first means for simulating said synchronization signals during silent sequences of said pictorial information display, and for applying said simulated signals to said first means for controlling the display of said silent sequences.

From a seventh aspect thereof, the invention resides in apparatus for synchronizing a display of motion-picture features by motion picture display means 13 with a playback of sound accompaniment, comprising (a) phase-lock servo loop means including means 70 for controlling the operation of said display means, and means 72 for providing feedback signals indicative of said display means operation, and (b) means 66, 69 for applying synchronization signals played-back substantially simultaneously with said sound accompaniment to said phase-lock servo loop means to cause a synchronization of said motion-picture display with said sound accompaniment, and (c) means 80 for applying a control signal simulating a predetermined synchronization signal to said phase-lock servo loop means for causing a control of said display means during intermissions of said sound playback.

From an eighth aspect thereof, the invention resides in apparatus for recording and playing back sound sequences and for synchronizing a display of motion-picture features by motion-picture display means 13 with a playback of said sound sequences, comprising (a) means 42 for recording synchronization signals for synchronizing said motion-picture display with said sound sequence playback, (b) phase-lock servo loop means including means 70 for controlling the operation of said display means, and means 72 for providing feedback signals indicative of said display means operation, and (c) means 42, 66 for playing back said synchronization signals with said sound sequences and for applying said played-back synchronization signals to said phase-lock servo loop means to cause a synchronization of said motion-picture display with said sound sequences, (d) means 80 for applying a control signal simulating a predetermined synchronization signal to said phase-lock servo loop means for causing a control of said display means during intermissions of said sound playback, and (e) means 265 for inhibiting said application of said simulating control signal during playback of said sound sequences and during said recording of said synchronization signals.

From a ninth aspect thereof, the invention resides in apparatus for recording sound sequences accompanying motion-picture features, comprising means 12 for recording said sound sequences, means 11 for photographing said motion picture features, selectively actuable means 141 functionally combined with said sound recording means for controlling said sound recording means, and means 128 functionally combined with said photographing means for controlling said photographing means in response to actuation of said means for controlling said sound recording means.

From a 10th aspect thereof, the invention resides in apparatus for driving a camera comprising means 80 for producing a control signal indicative of a desired speed of operation of said camera, means 22 for producing a feedback signal indicative of the actual speed of operation of said camera, and means 70 for varying the speed of operation of said camera in response to said control and feedback signals.

From an 11th aspect thereof, the invention resides in apparatus for preparing motion-picture sequences on film for synchronous display with sound accompaniments, comprising first means 16 for advancing said film, second means 22 connected to said film-advancing means for providing a first signal indicative of the film advancement rate, third means 42 connected to said second means for recording said first signal as a synchronization control signal for a display of said motion-picture sequences, fourth means 80 for providing a second signal indicative of a desired film advancement rate, and fifth means 70 connected to said third and fourth means for controlling said film advancement rate in response to said first and second signals.

BRIEF DESCRIPTION OF THE DRAWINGS

The invention will become more readily apparent from the following detailed description of preferred embodiments thereof, illustrated by way of example in the accompanying drawings, in which:

FIGS. 2a through 2d present a circuit diagram of an audiovisual recording and display system in accordance with a second preferred embodiment of the invention;

DESCRIPTION OF PREFERRED EMBODIMENTS

Figure 1:
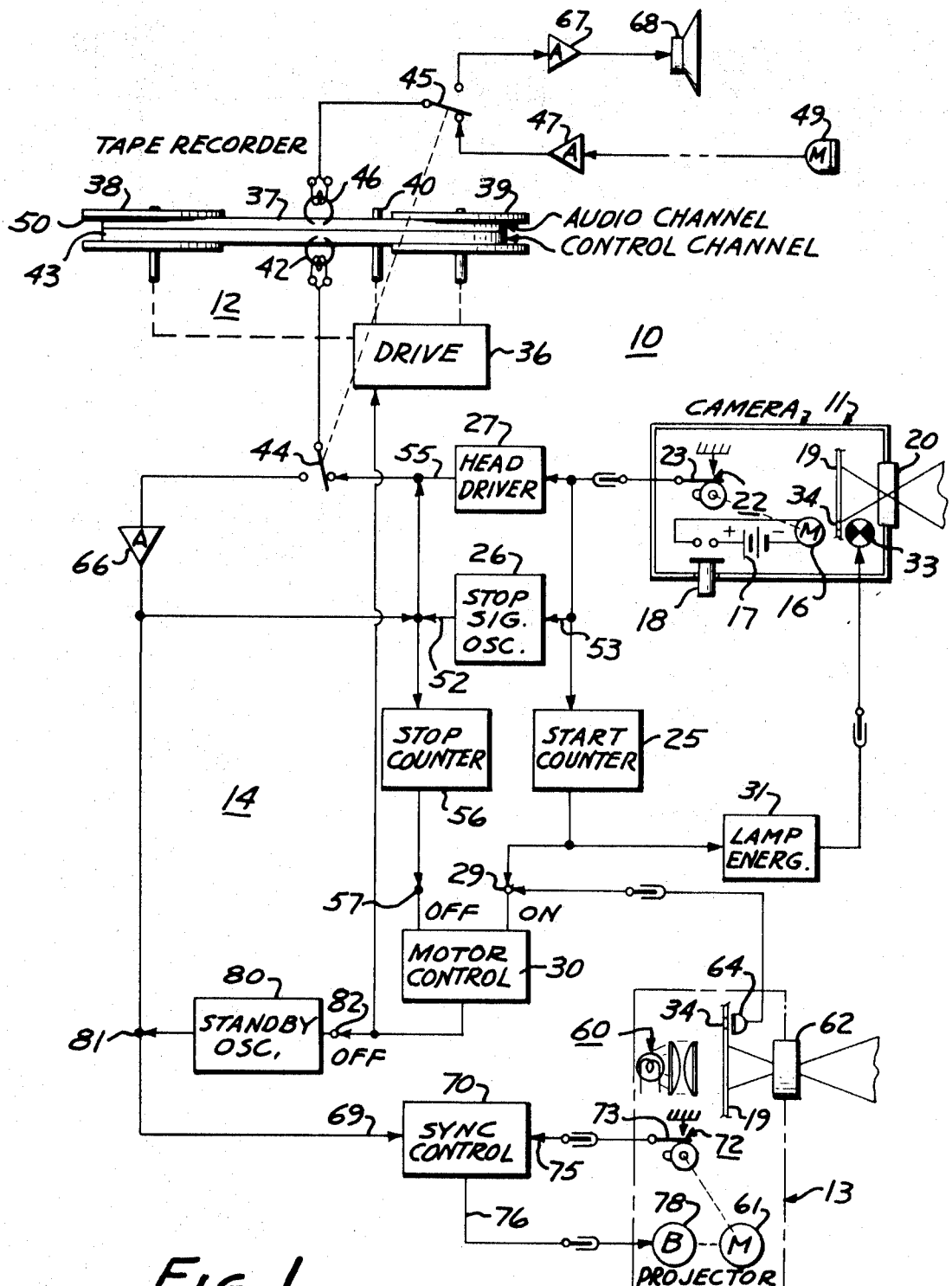
FIG. 1 is a block diagram of an audiovisual recording and display system in accordance with a first preferred embodiment of the invention.

The audiovisual recording and display system 10 illustrated in FIG. 1 includes a motion-picture camera 11, a sound recorder 12, a motion-picture projector 13 and a control system 14 for permitting a synchronized recording of sound accompaniments for features filmed with the camera 11, and a synchronized playback of sound accompaniments and display of motion-picture sequences.

The camera 11 includes an electric motor 16 which is energized from a battery 17 upon depression of a camera release button 18. In accordance with conventional practice the camera motor 16 advances a photosensitive film 19 and shutter means (not shown) in such a manner that objects and scenes may be photographed in the form of motion-picture features on the film 19 with the aid of a lens system 20.

The camera 11 further includes a pulse generator 22 having a cam-operated switch 23 actuated in such a manner that the generator 22 emits one pulse for every image frame on the film 19. As is already known in practice the generator 22 may be designed so as to emit one pulse for every succession of two, three, or N image frames, or to emit two, three or N pulses for each image frame.

The pulses which are produced by the generator 22 when the camera release 18 is depressed and the camera 11 thus rendered operative are applied to a start counter 25, a stop signal oscillator 26, and a head driver 27.

The start counter 25 is constructed to provide an output signal upon the application thereto of a predetermined number of input pulses. More specifically, if, in accordance with the teachings of the above-mentioned Lancor application, it is desired to start the recording of a sound accompaniment only after the lapse of a predetermined period of time from the commencement of the corresponding motion-picture feature, then the counter 25 is constructed to provide for such a delay.

In practical terms it is assumed for the moment that the counter 25 is to provide for a time delay of 1½ seconds and that the camera 11 is operating at a film speed of 18 frames per second. In this case, the start counter 25 is designed to provide an output signal after the application of 27 pulses from the generator 22 to its input.

The output signal thus produced by the start counter 25 is applied to the "on" terminal 29 of a motor control 30 and also to a lamp energization circuit 31. The latter circuit 31 is constructed so as to emit an electrical energy pulse of a predetermined duration in response to an output signal of the start counter 25. This pulse energizes a small lamp 33 in the camera 11 to provide a sound starter mark 34 on the film 19 by an exposure of such film to light produced by the lamp 33. As its name implies the sound starter mark signifies the commencement of a sound accompaniment sequence, as will be more fully explained as this description proceeds.

The motor control 30 is constructed so as to activate a tape drive 36 in the recorder 12 in response to the application of an "on" signal to the control terminal 29. Accordingly when the output signal of the start counter 25 is applied to the "on" terminal 29 of the control 30, the drive 36 advances a magnetic recording tape 37 from a supply reel 38 onto a takeup reel 39 with the aid of a capstan 40.

It will now be understood that the provision of the sound starter mark 34 and the start of the advancement of the tape 30 both occur with a delay relative to the start of the advancement of the film 19. The reasons for such a delay have been elaborated on in the above-mentioned copending Lancor application.

The synchronization pulses produced by the generator 22 are processed by a head driver 27 so as to be suitable for recording by means of a magnetic recording head 42 in a control channel or track 43 on the tape 37. To this end, a switch 44 is actuated so as to connect the head driver 27 to the head 42 when a recording of synchronization pulses on the tape 37 is desired.

The switch 44 may be ganged with a switch 45 which serves selectively to connect a magnetic recording head 46 to the output of an amplifier 47. Sound impressions picked up by a microphone 49 are transduced into electric signal variations which are amplified at 47 and recorded by the head 46 in a sound channel or track 50 on the magnetic recording tape 37. In this manner, sound accompaniment sequences for motion-picture features filmed by the camera 11 may be recorded on the tape 37.

To provide for a scene-correct playback of the sound accompaniments, a sound termination mark is recorded in the control track 43 at the end of each sound sequence. According to FIG. 1, a stop signal oscillator 26 serves to generate sound termination signals. This stop signal oscillator is constructed to provide a sound termination signal at its output 52 upon a cessation of input pulses at its input 53. More specifically, no sound termination signal appears at the oscillator output 52 as long as the generator 22 applies pulses to the oscillator input 53, while the oscillator 26 provides a sound termination signal at its output 52 when the pulse generator 22 ceases to apply pulses to the oscillator input 53 upon a stopping of a filming operation of the camera 11.

It is now seen that the synchronization pulses produced at 22 inhibit production of a sound termination signal by the oscillator 26, and that such inhibition ceases upon the stopping of the camera 11, resulting in the provision of a sound termination signal in the form of a burst of oscillations at the oscillator output 52.

According to an important feature of the subject invention, the sound termination signal produced by the oscillator 26 serves two purposes. First, it is applied through a lead 55 and switch 44 to the recording head 42 to be recorded in the control track 43 of the tape 37 where it serves as a sound-sequence termination mark. Secondly, it is applied to a stop counter 56 which, after a given delay, applies an off signal to an "off" input 57 of the motor control 30.

Application of this off signal causes the motor control 30 to have the tape drive 36 stop the magnetic recording tape 37. The stop counter 56 in effect counts the oscillations in the signal provided by the oscillator 26 and applies the mentioned off signal to the motor control 30 after the head 42 has had sufficient time to record an adequate number of sound stop oscillations on the tape 37.

The audiovisual record thus prepared is completed by a photographic development of the motion-picture film 19.

The developed film is displayed by the motion-picture projector 13 which includes a source 60 of light for illuminating the image frames, and an electric motor 61 for driving the film 19 and operating a shutter (not shown) in a conventional manner to provide for a display of the filmed scenes on a suitable surface or screen with the aid of a lens system 62.

The sound-starting mark 34 on the film 19 is sensed by a photocell 64. To enable such sensing, the mark 34 is illuminated with light derived either from the source 60 or from a special source or lamp (not shown). Upon the sensing of the mark 34, the photocell 64 applies a sound-starting signal to the "on" terminal of the motor control 30.

This results in an energization of the tape drive 36 and a consequent playback of sound recordings from the sound track 50, and control signal recordings from the control track 43 of the tape 37. Preparatory to such playback, the tape 37 is, of course, rewound on the reel 38 so that the sound accompaniment and control information commencements are adjacent the heads 42 and 46 which now operate as playback heads.

Also, the switch 44 is actuated to connect the head 42 to the amplifier 66, while the switch 45 is actuated to connect the head 46 to the amplifier 67. In this manner, the sound synchronization signals provided by the camera signal generator 22 and head driver 27, and the sound termination marks provided by the oscillator 26 are played back by the head 42 and amplified at 66. Similarly, sound accompaniments recorded by the head 46 are now played back and amplified at 67. A loudspeaker 68 connected to the amplifier 67 is shown as a means for audibly reproducing the played-back sound accompaniments while the motion-picture features are displayed.

To provide for a synchronous display of the motion-picture features and reproduction of the corresponding sound accompaniments, the played-back and amplified synchronization signals are applied to one input 69 of a synchronization control 70. It will be recalled at this juncture that these synchronization signals are in the form of pulses, having been produced by the pulse generator 22 in the camera 11. An analogue of the latter generator is provided in the projector 13 in the form of a pulse generator 72 including a cam-operated switch 73. Typically, the generator 72 is constructed to provide as many pulses per image frame as the generator 22.

The pulses provided by the generator 72 are applied to a second input 75 of the synchronization control 70.

Such control 70 compares the pulses arriving at the input 69 with the pulses applied to the input 75 and provides at an output 76 a control signal which has a predetermined average intensity when the pulses at 75 are in a given time relation to the pulses at 69 indicating synchronism between the sound reproduction and the motion-picture display. If such pulse time relation indicates that the picture display lags behind the sound reproduction, then the average intensity of the signal provided at 76 is lower than the predetermined intensity just mentioned. Conversely, if the time relation between the pulses at 69 and 75 indicates that the sound reproduction lags behind the motion-picture display, then the average intensity of the signal provided at 76 is higher than the above-mentioned predetermined intensity.

The output signal provided by the synchronization control 70 is applied to a braking device 78 which is coupled to the projector motor 61 to impose a variable braking effect on the film advancement during the motion-picture display. If the signal applied to the braking device 78 is of the above-mentioned predetermined intensity, the braking effect is such as to permit the film to advance in the projector 13 at a desired nominal speed or frame rate. If the intensity of such signal increases, so does the braking effect, while such braking effect decreases with decreasing intensity of the signal applied to the device 78.

Considering the fact that the device 78 controls the film speed or frame rate, while the pulse generator 72 provides pulses indicative of such film speed or frame rate, and considering further the fact that the control signal applied to the device 78 is derived from a comparison of time relationships of the pulses arriving at the synchronization control inputs 69 and 75, it is seen that the synchronization control 70, the braking device 78 which controls the speed of the motor, and the pulse generator 72 may be considered as being included in a phase-lock servo loop which is driven by externally produced synchronization information at the control input 69. It is also seen that the generator 72 may be viewed as a means for providing feedback pulses indicating the actual operation of the projector as far as the film speed or frame rate is concerned.

Whichever point of view is adopted, the projector speed control here under consideration provides for a highly reliable synchronization of motion-picture display and sound accompaniment playback in audiovisual display systems. Further information on synchronization systems of the subject type may be had from the above-mentioned Maxon patent application, while the aforesaid Lancor application discloses an alternative projector control according to which the energization of the projector motor itself is controlled.

According to a further important feature of the subject invention, the preferred embodiment illustrated in FIG. 1 includes a standby oscillator 80 which is constructed to provide at an output 81 pulses at a rate corresponding to a predetermined average or typical rate of synchronization pulses encountered at the control input 69. For instance, if a typical average rate of the latter pulses, which are played back from the tape 37 as mentioned above, is, say, 18 pulses per second, then the oscillator 80 is designed to produce 18 pulses per second.

As shown in FIG. 1, the oscillator 80 has an "off" input 82 connected to the output of the motor control 30. The signal applied by the motor control 30 to the tape drive 36, to energize such drive and to maintain it energized as long as desired, is also applied to the oscillator 80 through its "off" input 82 so as to inhibit generation by the oscillator 80 of the pulses described in the preceding paragraph. On the other hand, if the motor control 30 deenergizes the drive 36, then the signal at the oscillator "off" input 82 ceases and the oscillator 80 is no longer inhibited from operating.

The oscillator 80 thereupon generates and provides at its output 81 the above-mentioned pulses which are applied to the synchronizing control input 69 to control in the aforesaid manner the operation of the projector 13 in cooperation with the feedback pulses applied at the control input 75.

Based on this mode of operation, the significance of the standby oscillator 80 may be described as follows:

Synchronization signals for regulating operation of the projector 13 are played back from the tape 37 as long as motion-picture features displayed by the projector 13 are accompanied by sound sequences also played back from the tape 37 in the recorder 12. However, it frequently happens that a motion-picture amateur or producer wishes to provide one or more silent motion picture sequences between sound-accompanied motion-picture features. If no control signals were applied to the control input 69, the projector and servo loop would be without a reference input rate for its operation.

Typically, as the control pulses at the input 69 cease, the projector speed increases because of a decrease of the braking action provided by the brake 78. Such speed increase multiplies the feedback pulses provided by the pulse generator 72 whereupon a point is reached where the resulting increasing braking action stalls the film drive or otherwise spoils the motion-picture performance.

To prevent such occurrence, the tape 37 could be kept running during the preparation of silent motion-picture sequences, and synchronization pulses produced by the generator 22 in the camera 11 could then be recorded in the control track 43 of the tape 37. In this manner, control pulses for the input 69 of the synchronization control 70 would be available for silent as well as sound-accompanied motion-picture features. However, such a procedure would be highly wasteful since it requires a running of the tape even during the preparation of silent motion-picture sequences. While magnetic recording tape is, of course, not consumed in an absolute sense when left running during the preparation of silent sequences, it is nevertheless "consumed" in an economical sense, since the lengths of tape used during silent sequences are tied up along with the lengths used during sound features.

The standby oscillator 80 provided according to one aspect of the subject invention in effect simulates synchronization signals during a display of silent motion-picture sequences so as to provide for a purposeful continuity of the projector operation during sound-accompanied and during silent features alike, and so as to obviate undue consumption of recording tape. In a sense the oscillator 80 may be viewed as a synthetic analogue of the camera pulse generator 22, while such oscillator may, from another point of view, be regarded as a substitute for tape lengths which would otherwise be expended during the preparation of silent motion-picture sequences.

Circuit diagrams of the components included in FIG. 1 are illustrated by way of example in FIGS. 2a through 2d which also show various improvements and refinements that will be adequately disclosed as this description proceeds. To facilitate a comprehension of such circuit diagrams and avoid needless repetition, like or functionally equivalent circuits and parts as among FIGS. 1 and 2 are designated by like reference numerals, and the above description of such circuits and parts may be consulted for a fuller understanding thereof.

In the course of the following description reference will be made to certain jacks and plugs shown, respectively, at 91 through 99 and 100 through 107. Taking the plug 100 as an example, it will be noted that this plug has a shell contact 110 and a pin contact 111. Similarly, the jack 93, for instance, has a shell socket 112 for making contact with the shell 110 of the plug 100 and a pin contact 113 for making contact with the pin contact 111 of the plug 100. In addition, the jack 93 has a clip contact 114 for closing a circuit through the pin contact 113 when no plug is inserted in the jack, while the insertion of a plug breaks such circuit by movement of the pin contact 113 away from the clip contact 114.

Corresponding contact elements can be found in the plugs 101 through 107 and jack 94 through 99, respectively. To avoid stylistically awkward constructions, the expression "-contact" will hereinafter be avoided in connection with the elements presently under consideration, and these parts will simply be referred to as "shell," "pin," "clip" rather than "shell contact," "pin contact," "clip contact," etc.

Figure 2A:
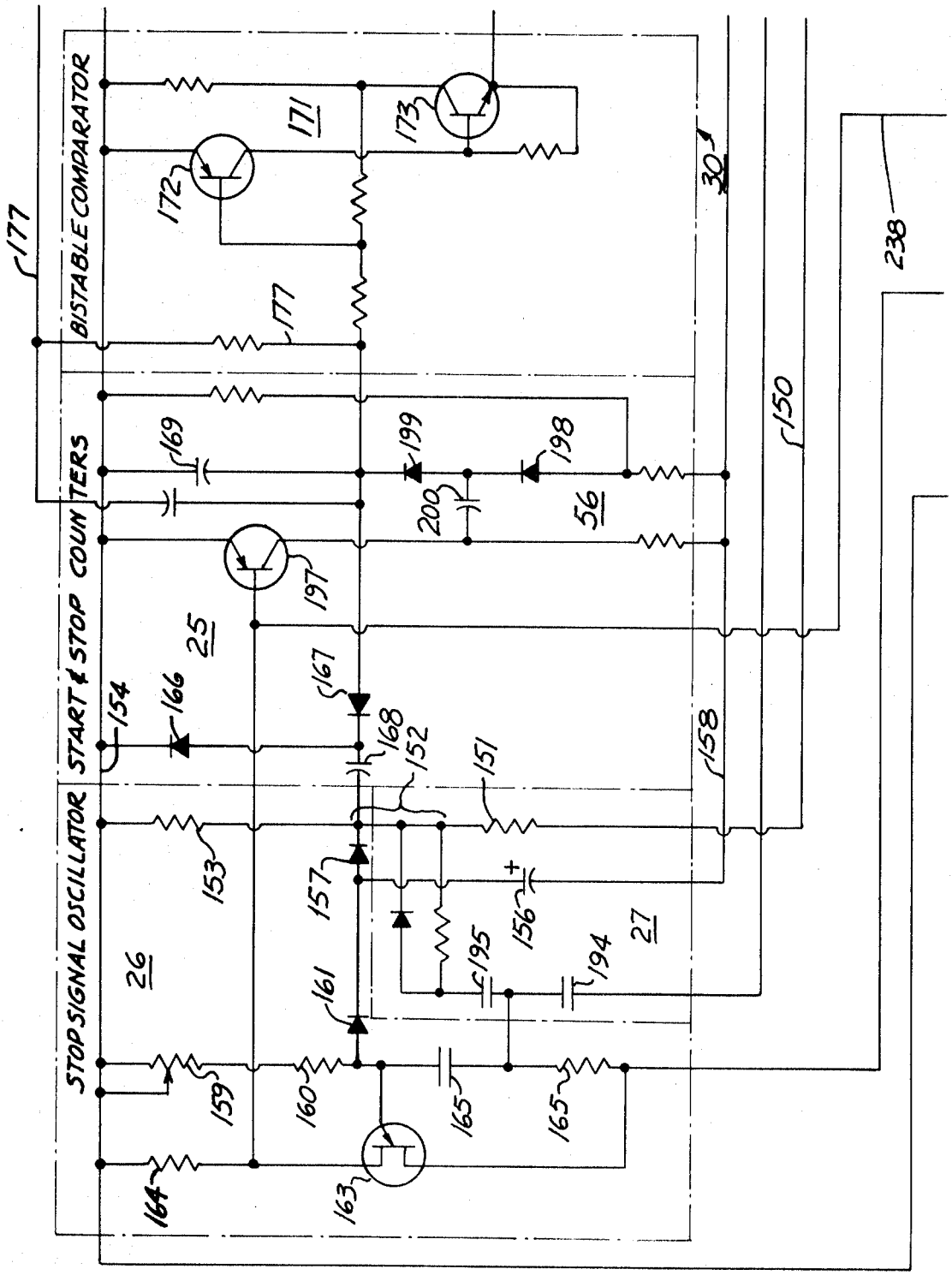
Figure 6:
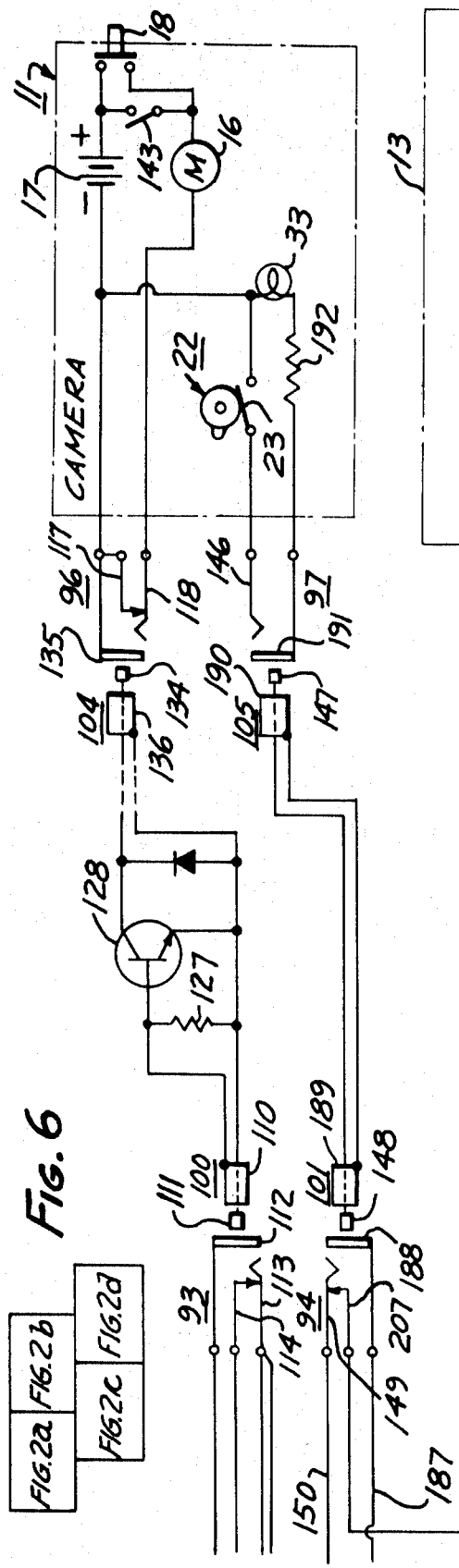
FIG. 6 is a diagram of the spatial relationship of the FIGS. 2a through 2d.
Figure 2D:
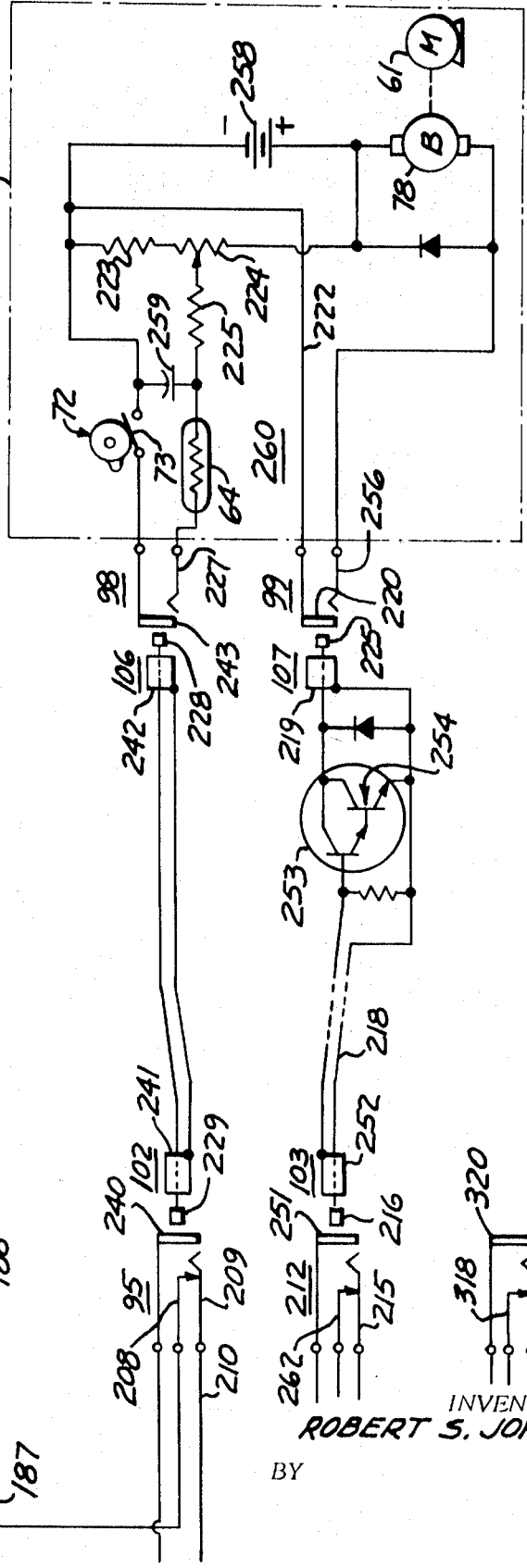

The camera 11 illustrated in FIG. 2d, which is similar to the camera 11 shown in FIG. 1, has a pair of jacks 96 and 97. When no plugs are inserted in these jacks, the pulse generator 22 and the start marker lamp 33 are inactive, while the clip 117 and the pin 118 of the jack 96 connect one terminal of the camera battery 17 to the camera motor 16 so that the camera 11 can be operated in a normal manner by actuation of the camera release 18.

Whether or not the camera can be operated in a like manner when the plug 104 is inserted in the jack 96 and the plug 100 in the jack 93 depends on such factors as the condition of the jack 92 and of a switch 120 which is closed when the tape recorder 12 is set for recording or playback.

In brief, the following circuit is established when the switch 120 is closed and no plug inserted into the jack 92:

negative terminal of a battery 121 in the tape recorder 12, ground 122, switch 120, clip 123 and pin 124 of jack 92, lead 125, pin 113 of jack 93, pin 111 of jack 100, lower terminal of resistor 127, emitter of transistor 128, base of transistor 128, upper terminal of resistor 127, shell 110 of plug 100, shell 112 of jack 93, lead 129, resistor 130, bridge 131 of switch 132, lead 133, and positive terminal of battery 121.

The various elements of this circuit are dimensioned such that the transistor 128 closes a current-conducting path between its emitter and collector when the circuit under consideration is closed as just described. Accordingly, the following circuit for energizing the camera motor 16 by actuation of the camera release 18 may then be established, provided the plug 104 is inserted in the jack 96:

negative terminal of camera battery 17, shell 135 of jack 96, shell 136 of the plug 104, emitter to collector of transistor 128, pin 134 of plug 104, pin 118 of jack 96, camera drive motor 16, camera release 18, and positive terminal of the battery 17.

If the sound recorder 12 has not been properly set so that the switch 120 or the switch 132 is still open, the path between the emitter and collector of the transistor 128 is open (i.e. has a high resistance), so that the camera motor 16 will not start upon depression of the button 18. This aspect of the subject invention provides an important safety feature in the operation of the illustrated audiovisual system.

The circuitry under consideration also enables a remote control of the camera 11. To this end, a plug 137 which is similar in design to the plugs 100 et seq. is inserted in the jack 92 so that the circuit through the clip 123 and pin 124 is broken, and so that the pin 138 of the plug 137 is in contact with the pin 124 of the jack 92, while the shell 139 of the plug 137 is in contact with the shell 140 of the jack 92.

Since the shell 140 is electrically connected to the clip 123, it is possible to selectively close and open the above-mentioned circuit including the battery 121 and transistor 128 by actuation of a switch 141 connected across the pin 138 and shell 139 of the plug 137. In brief, closing and opening of the switch 141 causes closing and opening of the current path between the emitter and the collector of the transistor 128.

Accordingly, if a normally open switch 143 bypassing the camera release 18 is closed, or the switch 18 locked into its closed position, the camera may be remote controlled by actuation of the switch 141 which may, for instance, be provided in the handle of the microphone 49 shown in FIG. 1.

To assure a cutoff of the transistor 128 at the desired moment, the base of such transistor is clamped to the negative terminal of the battery 121 by diodes 144, so that the electrical bias on the base of the transistor 128 is prevented from floating and rising with the bias of the emitter of this transistor when the switch 141 is opened. In the absence of such a safeguard, it might be impossible fully to switch off the transistor 128 by opening of the remote control switch 141.

Operation of the camera 11, either in response to actuation of the camera release 18 or upon remote control by the switch 141, causes the pulse generator 22 to provide synchronization pulses of the above-mentioned type in a circuit which can be traced as follows:

negative terminal of battery 121, ground, switch 120, clip 123 and pin 124 of jack 92 (or shell 140, shell 139 of plug 137, switch 141, pin 138, pin 124), lead 125, pin 113 of jack 93, pin 111 of plug 100, shell 136 of plug 104, shell 135 of jack 96, switch 23 of pulse generator 22, pin 146 of jack 97, pin 147 of plug 105, pin 148 of plug 101, pin 149 of jack 94, lead 150, resistor 151, junction 152, resistor 153, lead 154, and positive terminal of battery 121.

A capacitor 156 is connected to the junction 152 through a diode 157, and is also connected to ground through a leads 158 and 179. This capacitor is charged through a circuit including a variable resistor 159, a fixed resistor 160, and a diode 161. If this charging operation is not checked, the capacitor 156 is charged to a critical voltage that will cause the oscillator 26 to commence oscillating. The oscillator 26 includes a unijunction transistor 163, a load resistor 164, and circuit elements 165 connected as shown and dimensioned to provide an oscillation within a desired frequency range, such as an oscillation of about 1.5 kHz. to name an example.

Since the sync switch 23 in the camera is in effect connected in parallel to the capacitor 156, it periodically discharges such capacitor as long as the pulse generator 22 is activated during the operation of the camera 11. Accordingly, the critical voltage causing operation of the oscillator 26 is not reached as long as the pulse generator 22 is active. Rather, the generation of oscillations at 26 is inhibited during such time.

The pulses occurring at the junction 152 by action of the sync generator 22 are applied to a start counter 25 including diodes 166 and 167 and capacitors 168 and 169. The function of this counter 25 is to provide a critical voltage across the capacitor 169 after an application of a substantially predetermined number of pulses to the capacitor 168. As explained above, the counter 25 is designed so as to impose a given delay between the start of a camera operation and the commencement of a sound recording. Accordingly, if such delay is to be, say, 1½ seconds and the camera operates at, say, 18 frames per second, then the counter 25 is designed to "count" 27 pulses at the junction 152 before it provides the critical voltage across the capacitor 169.

The critical voltage just mentioned serves to switch on a Schmitt trigger 171 including transistors 172 and 173 and acting as a bistable comparator by comparing the voltage from the storage counter 25 to the reference voltage provided by the battery 121. Actuation of the Schmitt trigger 171 causes closing of a motor switch 175 including a power transistor 176.

The Schmitt trigger 171 as such is of conventional design. However, an improvement resides in the provision of a feedback path or circuit 177 from an output of the motor switch 175 to an input of the Schmitt trigger 171. Owing to such feedback circuit, the Schmitt trigger 171 displays a broad externally controlled hysteresis between the input voltage at which it will be switched on and the voltage at which it will switch off. In a sense, the feedback circuit 177 and the Schmitt trigger 171 can be viewed as providing a self-holding circuit for the motor switch 175.

The motor switch 176 closes an energizing circuit for the tape recorder drive or motor 36. This circuit may be described as follows:

negative terminal of battery 121, switch 120, clip 123 and pin 124 of jack 92, lead 179, transistor 176, diode 180, remote control jack 91, tape recorder motor 36, governor 182, and positive terminal of battery 121.

The remote control jack 91 is optional and may be provided to permit control of the tape recorder by such means as a foot switch, for example, to enable a controlled playback of recorded information when the recorder is operated in a conventional manner (consider, for instance, the transcription of dictated texts).

While the motor 36 is being started, the switch 175 also activates the lamp energizer 31. More specifically, current passing through the power transistor 176 acts on the series-connected capacitor 184 and resistor 185 to drive a transistor 186 to saturation and provide via lead 187 a pulse of electric energy which is transmitted to the camera lamp 33 through the shells 188, 189, 190 and 191 of the jack 94, plug 101, plug 105 and jack 97, respectively, and through the resistor 192.

The lamp 33 being connected to the negative terminal of the battery 121 through the same circuit as the sync switch 23, it will light up so as to place a start mark 34 on the film (see FIG. 1), signifying the commencement of a sound recording operation.

The pulses generated at 22 are applied to the recording head 42 through the head driver 27 for recording in the control track 43 of the tape 37 (see FIG. 1). The head driver includes capacitive elements 194 and 195 which form a resonating circuit with the winding of the head 42 so as to provide an optimum utilization of the sync pulse energy during the recording process.

In this manner, a synchronization of a subsequent display of motion-picture features relative to sound accompaniment playback is provided for during the filming of such features and recording of the sound accompaniments.

If the camera 11 is stopped by release of the button 18 or opening of the switch 141 as the case may be, the periodic shunting of the capacitor 156 by the sync generator switch 23 stops so that such capacitor is charged to the above-mentioned critical voltage which initiates oscillation of the oscillator 26. The oscillations thus provided are amplified by a transistor 197 and are also applied through the capacitor 194 to the magnetic head 42 for recording in the control track 43 (see FIG. 1) of the recording tape 37.

The oscillations amplified at 197 are applied to the stop counter 56 which includes diodes 198 and 199 and capacitors 200 and 169. This stop counter is designed to initiate a stopping of the tape motor after an adequate number of cycles of the above-mentioned oscillations have been recorded in the control track 43 by the head 42. To initiate such stopping operation, the stop counter 56 discharges the capacitor 169 until the Schmitt trigger 171 reverts to its quiescent state of operation, thereby switching off the transistor 176. This, in turn, deenergizes the tape recorder motor 36.

To provide for a rapid stopping of the recording tape 37, the capstan 40 (see FIG. 1) could be disengaged from the tape at the time of such stopping. In addition or in the alternative, FIG. 2 provides a motor brake 201 which includes a transistor 202 connected in parallel to the motor 36. The diode 180 maintains the transistor 202 nonconducting as long as the power switch 175 is closed.

However, upon opening of the motor switch 175 the transistor 202 shunts the counterelectromotive force generated by the coasting motor 36 thereby dynamically braking this motor to a rapid stop.

Reverting to the oscillator 26 it is seen that this oscillator not only provides oscillating energy for a sound termination mark recorded on the sound tape, but also the stop signal for the tape motor control applied through the amplifier 197 and counter 56. In other words, both the sound stop mark and the sound-recording stop signal originate with the stop signal oscillator 26. This is an important feature of the illustrated preferred embodiment since the motor control will be driven by substantially the same stop signal during sound recording as it will encounter during playback of the recorded sound.

To prepare the control illustrated in FIGS. 2a through 2d for sound playback and motion-picture display, the above-mentioned switch 132 (to the left of the tape recorder switch 120 in FIG. 2b) is moved to the right, so that the connection between the positive terminal of the battery 121 and the resistor 130 and jack shell 112 is broken at the bridge 131, and so that ground provided by the lead 125 is removed from the lower end of the winding of the head 42 and applied to the upper end of such winding, by movement of the contact bridge 203. In this manner the head 42 is connected to the playback amplifier 66 to be more fully discussed below.

During sound playback, the camera plug 100 is, of course, removed from the jack 93. This permits the pin 113 to contact the clip 114, thereby closing a circuit for the energization of the standby oscillator 80.

If the camera plug 101 is removed from the jack 94 and no plug is inserted into the jack 95, the input of the motor switch 175 is connected to the positive terminal of the battery 121 through the resistors 153 and 151 (at oscillator 26), lead 150, pin 149 and clip 207 of jack 94, clip 208 and pin 209 of jack 95, and a lead 210. This maintains the motor switch 176 in its "on" condition so that the tape drive motor 36 can be controlled through either of the remote jacks 91 and 92 or by means of the switch 120.

Reverting to the playback of sound accompaniments, the plug 102 is inserted into the jack 95, the plug 106 into the jack 98, the plug 103 into a jack 212, and the plug 107 into the jack 99.

As described above, the photocell 64 in the projector 13 serves to sense sound starter marks on film being displayed by means of that projector. To provide energy which can be gated by the photocell 64, a capacitor 259 is charged with current from an electric current source 258 through a potentiometer arrangement including a resistor 223, a variable resistor 224 which permits adjustment of the voltage to which the capacitor 259 is charged, and a resistor 225.

When the cell 64 is exposed to light through a sound starter mark 34 in the film 19, the energy stored by the capacitor 259 is applied through the cell 64 to the input of the motor switch 175 via a circuit including:

pin 227 of jack 98, pin 228 of plug 106, pin 229 of plug 102, pin 209 of jack 95, and lead 210.

The switch 175 and the tape recorder motor 36 are consequentially turned on. Owing to the presence of the feedback circuit 177 from an output of the transistor 176 to an input of the Schmitt trigger 171, the tape recorder motor 36 remains turned on even though the sound starter marks on the film are of only short lengths.

During the sound playback, the above-mentioned framerate-indicative pulses are also played back by the head 42 which now serves as a magnetic playback head. These played-back pulses are applied via a lead 231 to the input of the signal amplifier 66. The latter includes tree conventional stages 233, 234 and 235, whereof the stage 235 is designed as a differentiating amplifier stage to provide pulse spikes similar to those applied by the projector pulse generator 72 and to exercise low-amplitude noise.

The output 237 of the signal amplifier 66 is connected by a lead 238 to the base of the transistor 197 and by a lead 239 to the input 69 of the synchronization control 70. The playedback synchronization signals are however of too brief a duration and are too widely spaced from each other to cause production of an output signal by the stop counter 56. Rather, the connection 238 of the amplifier output 237 to the base of the transistor 197 comes into play during the sensing of a reproduced sound stop signal, as will be more fully described below.

The above-mentioned second input 75 of the sync control is connected to the feedback signal pulse generator 72 in the projector 13 by a circuit which includes the shells 240, 241, 242 and 243 of the jack 95, plug 102, plug 106 and jack 98, respectively, while the pulse generator 72 is in turn connected to the grounded negative terminal of the battery 121 through a circuit including:

the shell 220 of jack 99, shell 219 of plug 107, lead 218, pin 216 of plug 103, pin 215 of jack 212, lead 214, and switch 120.

A flip-flop arrangement 245 in the control 70 including two transistor stages 246 and 247 compares the played-back sync pulses arriving at 69 with the feedback pulses arriving at 75. The result of such comparison is a pulse width modulated signal coupled with the aid of capacitor 250 to the shell 251 of the jack 212 and varying in accordance with variations in the relative time relationship between the sync and feedback pulses.

The shell 252 of the plug 103 connects a Darlington-type switching amplifier 253 to the shell 251 to provide for an amplification of the latter variable signal. More specifically, the varying synchronization-control signal provided by the sync control 70 causes the amplifier 253 to provide a current-conducting path 254 of variable impedance between the shell 219 and the pin 255 of the plug 107. The shell 220 of the jack 99 is connected to the shell 219, while the pin 256 of such jack is connected to the pin 255 of the plug 107. Accordingly, the variable-impedance path appears between the shell 220 and pin 256.

To provide for a regulation of the speed or frame rate of the motion-picture display by the projector 13, the above-mentioned braking device 78 and a source of electric current 258 are connected across the latter variable impedance path which regulates the braking energy applied from the source 258 to the device 78. Since the feedback pulse generator 72, the sync control 70, the amplifier 253 and the braking device 78 are connected in a phase-lock servo loop 260, the braking effect produced at 78 corrects synchronization errors between the displayed motion-picture scenes and the played-back sound accompaniments.

The device 78, which may for instance include an eddy current or other suitable electric brake (see the above-mentioned Maxon application), is coupled to the symbolically illustrated film advance and shutter drive 61 of the motion picture projector so that the phase-lock servo loop 260 is closed between the device 78 and the feedback signal generator 72. If desired, the sync control 70 may be constructed to provide a variable signal suitable for regulating the energization of the projector motor itself (see the above-mentioned Lancor application).

At the end of a sound sequence, the head 42 senses the sound termination mark which was provided by the oscillator 26 and recorded in the control track 43 of the tape 37 in the manner described above. Since the pin 216 of the plug 103 separates the pin 215 from the clip 262 of the jack 212, the stop signal oscillator 26 is rendered inactive during the playback of sound accompaniments and display of motion-picture features. However, the sound stop signal played back by the head 42, amplified by the three-stage amplifier 66, and applied via the lead 238 to the base of the transistor 197, is of the same nature as the sound recorder stop signal provided by the oscillator 26 across the resistor 164.

Accordingly, if the latter stop signal applied to the base of the transistor 197 caused a stopping of the tape recorder 12, then the played-back stop signal applied via the lead 238 to the base of the transistor 197 will cause a stopping of the tape recorder 12. The significance of an important feature of the subject invention will now be recognized: since the stop signal oscillator 26 is used during recording to provide not only oscillations for the sound termination marks, but also oscillating stop signals for the tape recorder, simple and reliable circuitry responsive to the latter oscillating stop signals and the playedback sound sequence termination marks may be provided to control tape stopping during both sound recording and sound playback.

The played-back sound termination signal is amplified at 197 and thereupon applied to the stop counter 56 which in turn switches the Schmitt trigger 171 causing a switching off of the power transistor 176 and thus of the tape recorder motor 36.

The playback of the next succeeding sound sequence will be initiated upon the sensing of a sound start mark by the photocell 64. In some cases, however, a silent feature is provided between two sound-accompanied motion-picture sequences. In this case, a sound-slaved synchronization of the motion-picture display by the projector 13 is, of course, neither needed nor possible. However, if the input signal at 69 of the sync control 70 were merely terminated, the braking action provided by the device 78 would first decrease, resulting in a speed increase of the film drive. This, in turn, would increase the rate of the feedback pulses generated at 72 and the projector drive would behave erratically as mentioned above.

Accordingly, the standby oscillator 80 is provided to generate synthetic sync pulses which are applied to the sync control input 69 during the display of silent motion picture interludes. To prevent faulty operation, a plug inserted in the jack 93 during a sound-recording operation separates the pin 113 from the clip 114 and thus disconnects the oscillator 80 from the power source 121. However, the oscillator is connected to the battery 121 during motion-picture display, since no plug is then inserted into the jack 93.

As long as the motor switch 175 is closed, the oscillator 80 is prevented from oscillating by an inhibit gate 265 connected to an output of such motor switch by a lead 266. Operation of the oscillator 80 commences, however, when the sound playback process is stopped by an opening of the motor switch 175. The generated synthetic sync pulses are thereupon compared with the feedback pulses generated at 72 and the projector speed is kept in check by the resulting sync control signal amplified at 253 and applied to the braking device 78. The projector speed may be adjusted by actuation of a potentiometer 268 and the oscillator 80 includes in the embodiment illustrated in FIG. 2c a unijunction transistor 269 and resonance elements 270.

While many advantageous features have so far been disclosed, it should also be noted that the apparatus and systems according to the subject invention are characterized by a high degree of versatility. This is illustrated by way of example in FIGS. 3 and 4.

Figure 3:
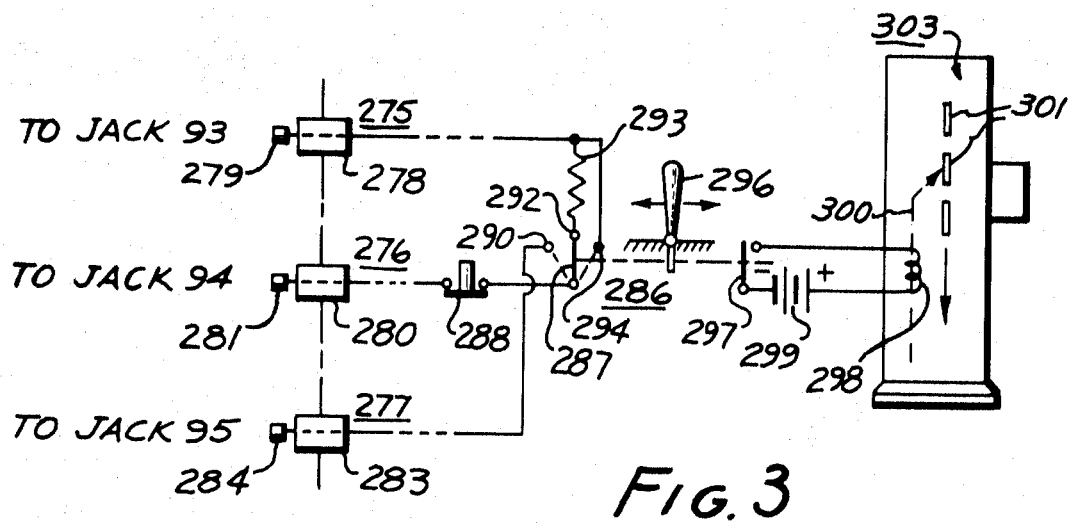
FIG. 3 is a circuit diagram of a first modification of the system illustrated in FIG. 2.

More specifically, FIG. 3 shows apparatus for programming an image slide or strip film display and providing sound accompaniments therefor. This apparatus includes plugs 275, 276 and 277. The plug 275 is inserted into the jack 93 of the system of FIGS. 2a through 2d so that its shell 278 contacts the shell 112 and its pin 279 contacts the pin 113 of the jack 93. Insertion of the plug 275 into the jack 93 results in a separation of the pin 113 from the clip 114, whereby operation of the standby oscillator 80, pulses of which could lead to faulty serial advance of slides or strip film, is inhibited.

The plug 276 shown in FIG. 3 is inserted into the jack 94 of FIG. 2d so that the shell 280 contacts the shell 188 and the pin 281 contacts the pin 149 of the jack 94. Such insertion also results in a separation of the pin 149 from the clip 207 of the jack 94 whereby the supply of current from the resistor 151 to the input of the power switch 175 is interrupted so that the tape recorder motor 36 can no longer be turned on without application of a start signal to the lead 150.

The plug 277 is inserted into the jack 95 shown in FIG. 2d so that the shell 283 and the pin 284 of such plug contact, respectively, the shell 240 and the pin 209 of the jack 95. This insertion separates the pin 209 from the clip 208 of the jack 95, which also interrupts the above-mentioned circuit between the resistor 151 and motor switch 175.

A switch 286 includes in the apparatus of FIG. 3 has a movable contact blade 287 connected through a normally closed switch 288 to the pin 281 of the plug 276 and thus, though the pin 149 of the jack 94, to the input of the start counter 27 via the lead 150. A first stationary contact 290 of the switch 286 is connected to the pin 284 of the plug 277 and thus, through the pin 209 of the jack 95, to the input of the motor switch 175.

A second stationary contact 292 of the switch 286 is connected through a resistor 293 to the pin 279 of the plug 275 and thus, by way of the pin 113 of the jack 93, to the lead 125 and from there to the negative terminal of the battery 121 shown in FIG. 2b. A third stationary contact 294 is also connected to such negative terminal without the intervention of the resistor 293, however.

The switch 286 is actuated by means of a lever 296 which closes a switch 297 when it is moved to place the switch blade 287 into engagement with the stationary contact 294 of the switch 286. Closure of the switch 297 results in energization of a solenoid 298 from a source of power 299. The solenoid 298 is part of an actuator 300 for advancing slides 301 or images of a strip film, with one slide or image being advanced in a still projector 303 upon each closure of the switch 297.

Preparatory to a programming operation, the slides 301 are arranged in a desired order. To simplify the subject description, it will hereafter be assumed that the images to be displayed are in the form of slides, although it should be understood that they may alternatively be located on strip film.

After the first slide is in position, it is displayed and the lever 296 is moved to the left so that the contact blade 287 engages the contact 290. This closes an energization circuit for the motor switch 175 from the resistor 151. As already explained, the motor switch 175 and the tape recorder motor 36 are turned on in this manner and maintained turned on by the feedback circuit 177. The lever 296 is thereupon released to its center position so that the contact blade 287 engages the contact 292.

In this position, the negative terminal of the battery 121 is connected through the resistor 293 and lead 150 to the resistor 151, with the presence of the resistor 293 causing inhibition of the operation of the stop signal oscillator 26. The recording tape thus continues to run and the desired sound accompaniment is recorded thereon.

If it is desired to advance the slide, the lever 296 is moved to the right which actuates the solenoid 298 and moves the contact blade 287 into engagement with the contact 294. This removes the resistor 293 from the circuit between the negative terminal of the battery 121 and the resistor 151 in FIGS. 2a and 2b. The result is an occurrence of a pulse or spike across tee winding of the head 42. This pulse is recorded on the control track 43 of the tape 37 and serves as a slide advance signal upon playback of the audiovisual slide/sound program, which is completed by recording the sound accompaniment for the next slide, by subsequently advancing such next slide in the manner just described, and so forth.

When it is desired to stop the recording tape, the switch 288 is opened whereupon the inhibition of the oscillator 26 is interrupted. This results in the generation of a sound termination signal which is recorded on the tape and which also stops the tape recorder motor through the stop counter 56.

Figure 4:
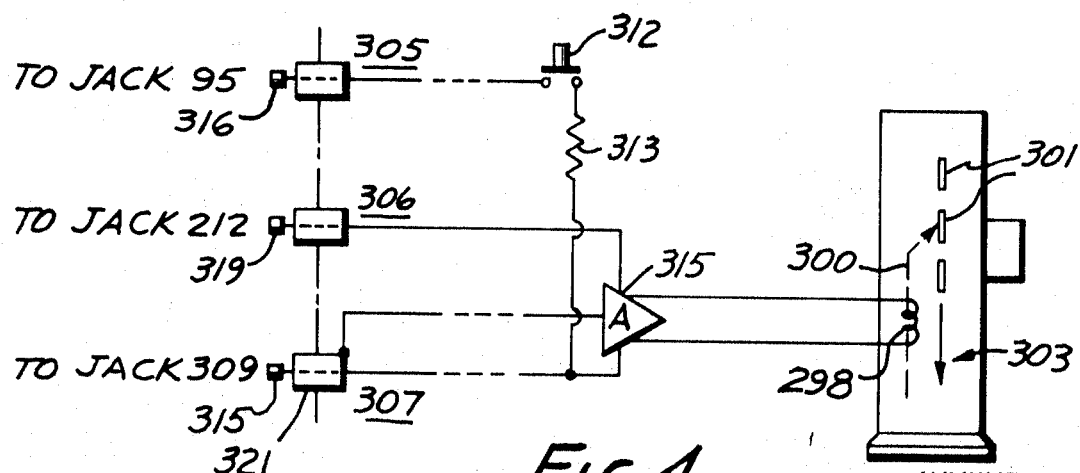
FIG. 4 is a circuit diagram of a second modification of the system shown in FIG. 2.

Preparatory to a playback of the audiovisual slide program, the plugs 305, 306 and 307 shown in FIG. 4 are inserted, respectively, into the jacks 95, 212 and 309 illustrated in FIG. 2d. This connects the series-connected switch 312 and current-limiting resistor 313 shown in FIG. 4 between the positive terminal of the battery 121 and the input of the motor switch 175, via the pins 315 and 316 of the plugs 307 and 305 shown in FIG. 4 and the pins 317 and 209 of the jacks 309 and 95 shown in FIG. 2d.

Accordingly, playback of sound accompaniments can be initiated by momentarily closing the switch 312. Operation of the standby oscillator 80 is inhibited by insertion of the plug 307 into the jack 309 which causes a separation of the pin 317 from the clip 318 and thus a removal of the positive terminal of the battery 121 from the potentiometer 268. Insertion of the plug 306 into the jack 212 inhibits operation of the stop signal oscillator 26 during the playback process by opening of the contact between the pin 215 and the clip 262 of the jack 212.

From time to time, one of the above-mentioned slide advance signals is played back from the tape by the head 42, amplified by the amplifier 66 and applied via the shell 320 of the jack 309 and the shell 321 of the plug 307 to a signal amplifier 315 in FIG. 4.

This amplifier is provided with power from the battery 121 through the pin 315 of the plug 307 and the pin 319 of the plug 306, and applies the amplified slide advance signal to the solenoid 298 of the actuator 300 which accordingly advances the next slide. This operation repeats itself until the entire audiovisual feature has been reproduced, whereupon the sound termination mark will be picked up by the head 42 to initiate a stopping of the tape and sound playback in the manner described above.

Figure 5:
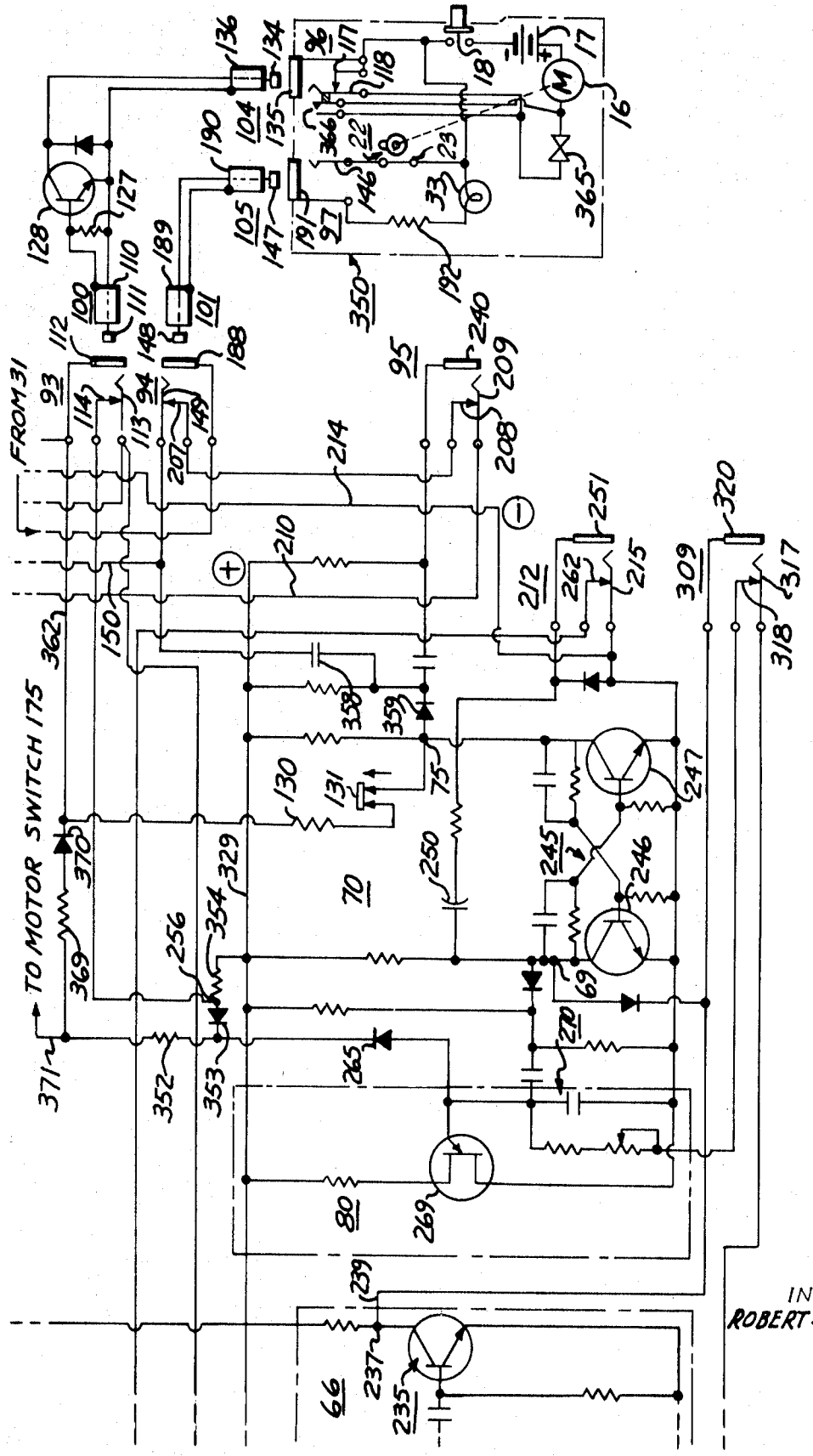
FIG. 5 is a circuit diagram of a third modification of the system shown in FIG. 2 for driving a motion-picture camera.

The system shown in FIG. 5 serves to drive a camera 350, which is similar to the camera 11 shown in FIG. 2d, at a desired frame rate.

In principle, it is possible in the system of FIGS. 2a through 2d to have the camera operate at different frame rates which may vary widely from each other. Upon playback the film advance means of motion-picture projector 13, controlled by sync pulses played back from the sound tape, would have to follow the wide variations in film frame rate which prevailed during the taking of the motion-picture features. In practice, this may place a heavy burden on the synchronization control 70 and on the equipment connected thereto and serving to maintain the desired sound-picture synchronism.

To overcome this problem, the system of FIG. 5 provides a control in which the frame rate in the camera is synchronized with or slaved to control pulses.

According to FIG. 5, the synchronization control 70 shown in FIG. 2c is employed for synchronizing the camera 350 with the operation of the standby oscillator 80 also shown in FIG. 2c. To avoid needless repetition, only the synchronization control 70, standby a oscillator 80, camera 350 and closely associated parts and circuits are shown in FIG. 5, while it is understood that these parts and circuits may be included in the overall system illustrated in FIGS. 2a through 2d. Accordingly, like reference numerals are employed to designate like parts as among FIGS. 2a through 2d and 5, and reference should be had to the above description of FIGS. 2a through 2d for a fuller understanding of the nature and operation of such like parts.

As has been explained above in connection with FIG. 2c, an inhibit gate 265 is connected between the motor switch 175 and the standby oscillator 80 for inhibiting the operation of the oscillator 80 as long as the motor switch 175 energizes the tape recorder motor 36. According to FIG. 5 a resistor 352 is connected between the motor switch 175 (i.e. the collector of the transistor 176) and the inhibit gate 265, and a series-connected diode 353 and resistor 354 are connected between the inhibit gate 265 and the power lead 329 which, in turn, is connected to the positive terminal of the battery 121 shown in FIG. 2b. The junction 256 between the diode 353 and resistor 354 is connected to the clip 114 of the jack 93.

When no plug is inserted into the jack 93, the clip 114 is in contact with the pin 113. Since this pin 113 of the jack 93 is connected to the negative terminal of the battery 121 shown in FIG. 2b, the diode 353 is blocked and the inhibit gate 265 precludes operation of the standby oscillator 80 as long as the motor switch 175 shown in FIG. 2b is on and the tape recorder motor 36 running.

However, insertion of the plug 100 into the jack 93 separates the pin 113 from the clip 114, thereby unblocking the diode 353. The inhibit gate 265 is thereupon blocked by a positive bias applied from the power lead 329 through the resistor 354 and diode 353, and the standby oscillator 80 is permitted to operate even if the tape recorder motor 36 is running.

In this manner it is possible to maintain the frame rate in the camera 350 constant with the aid of the standby oscillator 80 during a filming of motion picture features and recording of related sound accompaniments.

As before, the oscillator 80 applies simulated synchronization pulses at a desired rate (such as 18 pulses per second) to the first input 69 of the sync control 70. The pulse generator 23 in the camera 350, on the other hand, applies feedback pulses indicative of the actual film frame rate in the camera to the second input 75 of the sync control 70. To this effect, the pulse generator 23 is connected to the sync control input 75 through a circuit including:

pin 146 of jack 97, pin 147 of plug 105, pin 148 of plug 101, pin 149 of jack 94, capacitor 358 and diode 359.

The sync control 70 compares the pulses received at 75 with the pulses received at 69 and provides at 75, which serves not only as the second input but also as an output of the sync control 70, a pulse width modulated signal. This signal varies in accordance with variations in a time relationship between the pulses received at 69 and those received at 75 and is applied to the base of the transistor 128 through a circuit which may be traced as follows:

point 75, slidable contact bridge 131 (which, with different interconnections, has been shown in FIG. 2b at 132), the resistor 130 also shown in FIG. 2c, lead 362, shell 112 of jack 93, shell 110 of plug 100, and base of transistor 128.

The control pulses thus applied to the base of the transistor 128 vary the emitter-collector impedance of such transistor which is connected between the camera motor 16 and the camera battery 17. Accordingly, the energization of the motor 16 and thus the speed or frame rate of the film in the camera 350 are controlled from the sync control 70. Such control 70, the motor 16 and the pulse generator 23 may be considered as being connected in a phase-locked servo loop which is driven by the oscillator 80 until the frame rate in the camera corresponds to the rate dictated by the oscillator 80.

To prevent the camera speed governor 365 from interfering with the latter servo operation, a normally open switch 366 may be connected in parallel thereto. This switch closes when the plug 104 is inserted into the jack 96 and shunts the governor 365 during a slaving of the camera 350 to the oscillator 80.

Alternatively, the shunting switch 366 is omitted and the pulse rate provided by the oscillator 80 is set to some 1 or 2 pulses per second lower than the rate of closing of the contacts of the camera governor 365. In this connection, it should be understood that such governor typically is a speed-responsive device which closes a pair of contacts for periods of time the duration of which varies inversely to the frame rate prevailing in the camera. In other words, the governor 365 closes the circuit between the camera motor 16 and the battery 17 for longer periods of time relative to a nominal value when the frame rate in the camera is lower than as indicated by such nominal value. Conversely, the governor 365 closes the circuit between the camera motor 16 and the battery 17 for shorter periods of time relative to the mentioned nominal value when the frame rate at which the film is advanced in the camera is higher than that corresponding to such nominal value.

Accordingly, if the rate of the pulses provided by the oscillator 80 is such as to cause the camera 350 to operate at a frame rate lower than the nominal frame rate to which the camera governor has been adjusted, such governor 365 can be made to remain closed during the control operation carried out by the sync control 70. In consequence, the governor 365 will not interfere with such control operation.

If desired, a series-connected resistor 369 and diode 370 may be inserted between the shell 112 of the jack 93 and the lead 371 which is connected to the collector of the transistor 176 of the motor switch 175 and, through the tape recorder motor 36, also to the positive terminal of the battery 121 (see FIG. 2b). During the above-mentioned delay between the commencement of a filming operation and the start of a sound recording operation current can flow from the positive terminal of the battery 121 in FIG. 2b to the base of the transistor 128 in FIG. 5, via the governor 182, tape recorder motor 36, jack 91, diode 180, resistor 369, diode 370, and shells 112 and 110 of the jack 93 and plug 100, respectively. While such current is insufficient to energize the tape recorder motor, it does turn on the transistor 128, thereby causing the camera 350 to start its operation.

Upon expiration of the mentioned delay, closing of the motor switch 175 blocks the diode 370 so that control of the camera drive is transferred to the sync control 70 driven by the oscillator 80. The latter transition proceeds in a smooth manner when the camera operation is first started in the manner just described.

While specific aspects and embodiments of the subject invention have been described and illustrated herein, modifications within the spirit and scope of the subject invention will be apparent or suggest themselves to those skilled in the art.

I claim:
1. In audiovisual apparatus:
   a. selectively actuable first means for retaining pictorial information;
   b. second means responsive to actuation of said first means to provide a first control signal during said actuation;
   c. selectively actuable third means for recording sound accompaniments for said pictorial information;
   d. selectively actuable fourth means for providing a second control signal;
   e. fifth means connected to said third and fourth means for recording said second control signal and for terminating a recording operation of said third means in response to said second control signal; and
   f. sixth means connected to said second and fourth means for inhibiting provision of said second control signal in response to said first control signal, and for permitting provision of said second control signal upon cessation of said first control signal.
2. Apparatus as claimed in claim 1, wherein:
   a. said first means include means for photographing pictorial information; and
   b. said second means are constructed to provide said first control signal as a signal for synchronizing said sound accompaniments with said photographed pictorial information.
3. Apparatus as claimed in claim 2, wherein said sixth means inhibit provision of said second control signal in response to said synchronization signal and in such a manner that each second control signal provided by said fourth means signifies the end of a sound accompaniment for said photographed pictorial information.
4. An apparatus for synchronizing a display of pictorial information with a playback of sound accompaniment;
   a. control means for controlling the film advancement rate of pictorial information,
   b. synchronization means providing synchronization signals simultaneously with said sound accompaniment for synchronizing said display with said playback; and
   c. means connected to said control means and said signal synchronization means for simulating said synchronization signals during the absence of said synchronizing signals corresponding to inoperative periods of said sound accompaniment, and for applying said simulated signals to said control means for controlling the display of said silent sequences.
5. Apparatus as claimed in claim 4 including means for providing feedback signals generated in response to said film advancement rate, wherein said control means controls the display of pictorial information in response to a comparison of said synchronization signals and feedback signals during sound accompaniment and wherein said control means selectively controls said film advancement in response to a comparison of said simulated signals and said feedback signals during inoperative periods of said sound accompaniment.
6. An apparatus for synchronizing a display of motion-picture features by motion picture display means with a playback of sound accompaniment:
   a. phase-lock servo loop means including means for controlling the film advancement rate of said display means, and means for providing feedback signals indicative of the film advancement rate of said display means;
   b. means for applying synchronization signals simultaneously with said sound accompaniment to said phase-lock servo loop means to cause a synchronization of said motion picture display with said sound accompaniment; and
   c. means for applying a control signal simulating a predetermined synchronization signal to said phase-lock servo loop means for causing a control of the film advancement rate of said display means during inoperative periods of said synchronization signal means.
7. Apparatus as claimed in claim 6, wherein:
   a. said synchronization signals include synchronization pulses; and
   b. wherein said control signal applying means includes means for generating simulated synchronization pulses.
8. Apparatus as claimed in claim 7, wherein said control signal applying means includes means for initiating a generation of said simulated synchronization pulses in response to the commencement of inoperative periods of said synchronization signal means.
9. Apparatus as claimed in claim 6, including:
   a. terminal means;
   b. means connected to said terminal means for providing at said terminal means electrical energy for a control signal; and
   c. means functionally combined with said terminal means and connected to said means for applying a simulated control signals for inhibiting provision of said simulated control signal in response to an operation including a connection to said terminal means of means for deriving said electrical energy from said terminal means.
10. Apparatus as claimed in claim 6, including:
    a. terminal means;
    b. means for connecting motion-picture camera means to said terminal means; and
    c. means functionally combined with said terminal means for inhibiting provision of said simulated control signal in response to an operation including a connection of said motion-picture camera means to said terminal means.
11. In apparatus for recording and playing back sound sequences and for synchronizing a display of motion picture features by motion-picture display means with a playback of said sound sequences:
    a. means for recording synchronization signals for synchronizing said motion-picture display with said sound sequence playback;
    b. phase-lock servo loop means including means for controlling the operation of said display means, and means for providing feedback signals indicative of said display means operation;
    c. means for playing back said synchronization signals with said sound sequences and for applying said played-back synchronization signals to said phase-lock servo loop means to cause a synchronization of said motion picture display with said sound sequences;
    d. means for applying a control signal simulating a predetermined synchronization signal to said phase-lock servo loop means for causing a control of said display means during intermissions of said sound playback; and
    e. means for inhibiting said application of said simulating control signal during playback of said sound sequences and during said recording of said synchronization signals.
12. In apparatus for recording sound accompaniments for pictorial features: terminal means for receiving control signals for starting sound-recording operations and for providing information for synchronizing a display of said pictorial features with a playback of said sound accompaniments, and means functionally combined with said terminal means for selectively energizing said sound recorder independent of said control signals, means selectively connectable to said terminal means for applying said control signals to said terminal means said terminal means including means activated in response to an operation including detachment of said connectable means from said terminal means for permitting commencement of said sound-recording operations in the absence of said control signals.
13. An apparatus for playing back sound accompaniments for pictorial features displayed by motion-picture film com- prising: terminal means for receiving signals indicating desired commencements of said sound accompaniments, and for receiving signals indicative of a predetermined operation of said picture display means, said terminal means being connected to receive signals produced in response to start markings on said motion picture film, and to receive signals indicative of a rate of advancement of said motion picture film.

14. In apparatus for recording and playing back sound accompaniments for pictorial information:
 a. means for controlling said recording and playback sound accompaniments, said control means including means for providing control signals indicative of a termination of each sound accompaniment;
 b. terminal means connected to said control means;
 c. means selectively connectable to said terminal means for connecting electrical parts of means for displaying said pictorial information to said terminal means; and
 d. means responsive to a connection of said selectively connectable means to said terminal means for inhibiting operation of said means for providing said control signals indicative of said termination.

15. In apparatus for playing back sound accompaniments for pictorial information:
 a. first means for playing back first control signals for controlling a display of said pictorial information;
 b. second means connected to said first means for comparing said control signals with feedback signals indicative of said display to produce a second control signal for controlling a display of said pictorial information;
 c. third means connected to said second means for selectively simulating said first control signals and for causing said second means to compare said simulated control signals with said feedback signals; and
 d. means including terminal means connected to said first means for deriving said first control signals from said first means, and means operatively associated with said terminal means for selectively suspending operation of said third means.

\* \* \* \* \*